March 25, 1952  F. C. SAUSA  2,590,215
VARIABLE THROAT RESTRICTER VALVE
Filed Feb. 21, 1947
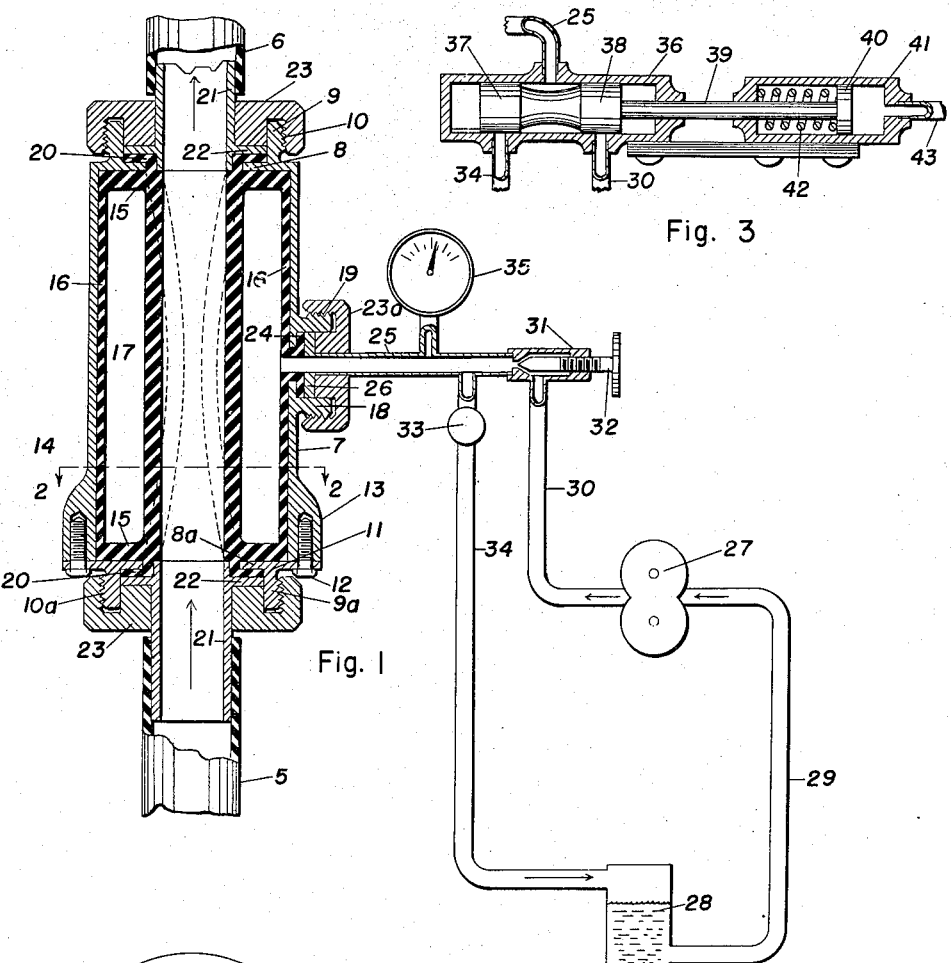
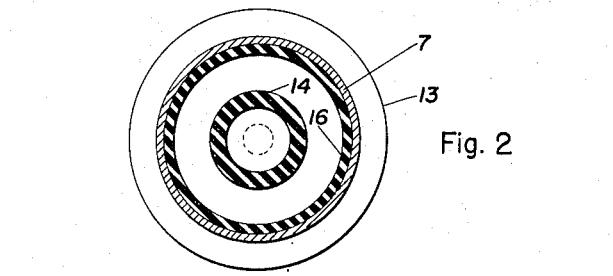
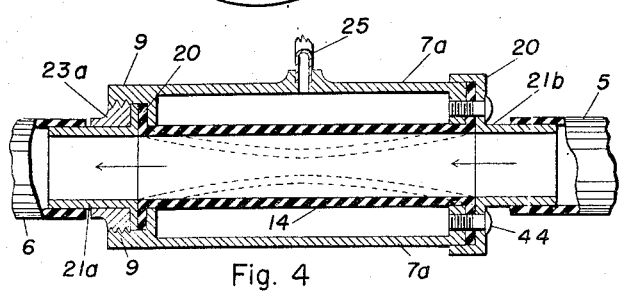
INVENTOR.
Frank C. Sausa
BY
Martin E. Anderson
ATTORNEY Patented Mar. 25, 1952

2,590,215

UNITED STATES PATENT OFFICE 2,590,215

VARIABLE THROAT RESTRICTER VALVE

Frank C. Sausa, Englewood, Colo.

Application February 21, 1947, Serial No. 730,094

4 Claims. (Cl. 138—45)

This invention relates to improvements in valves and has reference more particularly to an improved variable throat restrictor valve.

In many places where liquids are handled by means of pumps or other pressure apparatus, it is desirable to provide the discharge pipe with a valve mechanism by means of which the rate of flow can be varied.

In many places, liquids, such as acids and alkalies are handled, but the valves usually employed in connection with steam and water are not adapted for controlling such liquids because they have the property of corroding metal. In other cases, water carrying sand or other abradant material, as well as small amounts of fibrous material must be handled and the ordinary valve is not suited for controlling the flow of such liquids. The abradant very soon wears out the valve seats and if fibers are present they clog the pipe at the point where the valve is located.

It is the object of this invention to produce a valve of such construction that it will present to the liquid only such materials as are not effected chemically thereby.

A further object is to produce a valve having a smooth bore so as to eliminate all projecting surfaces that might catch fibrous material.

Another object of the invention is to produce a valve of the type described whose throat area can be readily changed by means of hydraulic or air pressure, either manually or by automatic means.

A further object of the invention is to produce a valve of such construction that it can be readily manufactured and assembled and in which the movable and flexible surfaces are entirely encased in a protective covering of metal or other suitable material.

The above and other objects that may appear as this description proceeds are attained by means of a construction and an arrangement of parts that will now be described in detail and for this purpose reference will be had to the accompanying drawing in which the invention has been illustrated in its preferred embodiment, and in which:

Figure 1 is a longitudinal diametrical section of the valve and a diagrammatic showing of the pressure producing and controlling apparatus;

Figure 2 is a section taken on line 2—2, Figure 1;

Figure 3 is a diagrammatic representation of an automotive control mechanism; and Figure 4 shows a slightly modified form of construction.

In the drawing reference numerals 5 and 6 designate the pipes or hose through which the liquid flows and between the ends of which the valve is positioned. The valve consists of a cylindrical housing 7 having one end provided with an inturned flange or wall 8 from which a cylindrical flange 9 extends outwardly. Flange 8 projects inwardly beyond the inner surface of flange 9 and the outer surface of the latter is threaded as indicated at 10. The other end of the housing is open and is provided with a cover 11 that is held in position by means of screws 12 which engage in threaded openings in the thickened portion 13 of the housing. A cylindrical flange 9a extends outwardly from the closure 11 and is threaded on its outer surface as designated by 10a. Positioned in the housing is an elongated valve member formed from some flexible material, such as natural or synthetic rubber, or from some suitable plastic. This member comprises an inner tube 14 that is provided near each end with an outwardly projecting flange 15. Flanges 15 are connected by means of a cylindrical member 16 so as to form an annular chamber 17. The housing is provided on one side with an outwardly extending cylindrical flange 18, whose outer surface is threaded as indicated at 19. The wall of the housing is provided with an opening concentric with the opening in flange 18 but of smaller diameter so as to leave an inwardly extending flange as shown in Figure 1.

The distortable tubular member that has already been described in part, has each end provided with an outwardly extending flange 20 that rests on the outer surface of flanges 8 and 8a. A short tubular member 21 is provided at each end and these tubular members are provided with outwardly extending flanges 22 that rest against the outer surfaces of flanges 20. A cap 23 is provided at each end and has an annular groove for the reception of flanges 9 and 9a, to the outer surface of which they are threadedly engaged. Caps 23 serve to force flanges 22 against flanges 20 so as to form a tight seal at these points. The tubular members 21 extend inwardly so as to make a tight fitting seal with the ends of the tubular member 14. Members 21 may be made of metal, of glass, of plastic, or of any other suitable material which is not chemically acted upon by the liquid whose flow is to be controlled. The tubular outer wall 16 is provided at one side with a projection having a flange 24 that overlaps the inwardly extending flange about the opening into the interior of cylindrical flange 18. A pipe 25 whose inner end is provided with an outwardly extending flange 26 is positioned with the flange 26 within cylindrical flange 18 and the parts are held in position and subjected to pressure by means of a cap 23a. It is now apparent that if the annular chamber 17 is subjected to a pressure greater than that of the liquid flowing through the inside of tube 14, the latter will be moved inwardly so as to restrict the cross sectional area of the opening therein. The dotted lines in Figure 1 indicate the position of the wall of tube 14 in its extreme contracted position. The liquid that flows through pipes 5 and 6 may be flowing under the influence of gravity or may be propelled by pumps, or in any other suitable way.

In order to control the throat opening of the valve by means of pressure, it is necessary to provide a mechanism for supplying a liquid under pressure whenever it is needed and the drawing therefore shows in a diagrammatic manner a means for this purpose.

The pressure producing means comprises a pump of any suitable kind, but which, in the drawing, has been shown as a gear pump that has been designated by reference numeral 27. The intake port is provided with a sump 28 by means of a pipe 29 and the delivery port is connected by means of a pipe 30 to a valve 31. Valve 31 is provided with a rotatable valve member 32 by means of which the opening can be controlled. Pipe 25 connects valve 31 with the interior of the distortable valve member or with annular chamber 17, as shown. By opening valve 31, liquid under pressure will be forced into the annular chamber and will restrict the opening to any extent desired. In order to increase the opening, it is necessary to relieve the pressure in chamber 17 and this is effected by means of a valve 33 positioned in pipe 34 that connects the interior of pipe 25 with the sump 28. A pressure gauge 35 may be provided in pipe 25, if desired.

The controlled mechanism shown in Figure 1 is manually operated. However, it is the intention to provide automatic means for this purpose wherever an automatically operating device is desirable. In Figure 3 an automatic control means has been illustrated in a somewhat diagrammatic manner. Instead of valve 31, as shown in Figure 1, a slide valve comprising a cylindrical housing 36 is provided. Pipe 25 is connected with the interior of the cylindrical housing and opens into the space between the cylindrical ends 37 and 38 of the tubular type slide valve. The pressure supply pipes 30 and the discharge pipe 34 are connected so that both of them may be closed by the cylindrical portions 37 and 38 of the slide valve and either of them may be put into communication with pipe 25 by moving the slide valve in the corresponding direction. A piston rod 39 connects the movable slide valve with a piston 40 located in a cylinder 41. A compression spring 42 serves to move the piston 40 outwardly and the piston is acted upon by a pressure transmitted to it through pipe 43. Variations in the pressure to which the piston 40 is subjected controls the slide valve so as to either increase or decrease the pressure in annular chamber 17 and in this way an automatic operation responsive to a variation in pressure in any part of the mechanism with which the valve is used, can be effected. Instead of having the piston acted upon by pressure, as shown, it may be made responsive to other forces such as variations in an electric current or the like.

In Figure 4 a slightly modified and simplified construction has been shown. In the preferred form as illustrated in Figure 1, the tubular member forming the throat is formed from two tubes of different size connected at their ends to form a hermetically sealed chamber. Since the fluid used to compress tube 14 may be water, oil or other liquid that has no chemical action on metal, it is permissible to omit the outer tube 16 as well as the ends 15, as illustrated in Figure 4. The specific means illustrated in Figure 1 for effecting a seal between the end closures and the ends of tube 14 may also be replaced by other equivalent means. In the embodiment illustrated in Figure 4 housing 7a may be constructed like that shown in Figure 1 and nuts or caps 23 may be replaced by plugs 23a as shown at the left in Figure 4. It is also possible to replace flange 9 with a member 21b that may be held in place by screws 44 which force the flange of member 21b against the flange of tube 14. The construction illustrated in Figure 4 is of very simple construction and will perform the same function. Where cost is a matter of consideration, the construction shown in Figure 4 or some equivalent construction, can be used in the place of that shown in Figure 1.

Particular attention is called to the specific construction of the valve and to its great simplicity and ruggedness. The flexible distortable member is fully protected against injury by the housing 7 and is so combined with the enclosing housing and the other parts as to form reliable seals at all points where leakage might occur.

Although a specific automatic control valve has been illustrated, it is, of course, permissible to substitute any other equivalent means, for example, a control valve like that shown in United States Patent 994,167 granted to Koppitz, on June 6, 1911, may be used.

Having described the invention what is claimed as new is:

1. A variable throat liquid flow control valve comprising, an elongated tubular housing having end closures provided with openings of smaller cross sectional area than and in axial alignment with the interior of the housing, a cylindrical flange integral with and projecting outwardly from each end closure, the inside diameter of the flange being larger than the diameter of the opening, forming an inwardly extending flange, a tube of elastic material positioned in the housing, the ends of the tube projecting through the openings in the end closures, the tube terminating in outward flanges lapping the flanges within the cylindrical flanges, one surface of each cylindrical flange being threaded, a clamping member threadedly connected with each flange and provided with a tubular plug positioned to engage the corresponding flange of the tube, forcing it against the end closure to form a seal, and means for introducing a fluid into the space between the tube and the inside of the housing, under sufficient pressure to decrease the cross sectional area of the tube.

2. A variable throat liquid flow control valve comprising, an elongated tubular housing having end closures, at least one of which is removable, each end closure having a circular opening of smaller diameter than the inside of the housing, a double walled tube of elastic material positioned in the housing, the outer tube being connected at its ends with the inner tube, forming an annular chamber between the two layers of the tube, the outer diameter of the outer tube being substantially equal to the inside diameter of the housing, the ends of the tube extending through the openings in the end closures, terminating in outwardly extending flanges lapping the outer surfaces of the end closures, means for forcing the tube flanges against the end closures to form a seal, and a tube communicating the space between the two tubes with a source of fluid under pressure, whereby when fluid is introduced into the space between the tubes, the cross sectional area of the opening in the inner tube will be reduced.

3. A variable throat liquid flow control valve comprising, an elongated tubular housing having end closures, at least one of which is removable, each end closure having a circular opening of smaller diameter than the inside of the housing, each end closure having a circular flange extending outwardly therefrom in concentric relation to the opening, the inside diameter of the cylindrical flange being greater than the diameter of the opening, one wall of the cylindrical flanges being threaded, a double walled tube of elastic material positioned in the housing, the outer tube being connected at its ends with the inner tube forming an annular chamber between the two layers of the tube, the outer diameter of the outer tube being substantially equal to the inside diameter of the housing, the ends of the inner tube extending through the openings in the end closures, terminating in outwardly extending flanges lapping the outer surfaces of the end closures, means for forcing the tube flanges against the end closures to form a seal, said means comprising tubular plugs threadedly connected with the cylindrical flanges for engaging the outturned flanges of the tube, and a tube communicating the space between the two tubes with a source of fluid under pressure, whereby when fluid is introduced into the space between the tubes, the cross sectional area of the opening in the inner tube will be reached.

4. A variable throat liquid flow control valve, comprising, an elongated cylindrical tube of elastic material having outwardly extending flanges at its ends, each flange having an inner face and an outer face, the tube normally being of the same internal diameter throughout its length, a cylindrical housing surrounding the tube throughout its length to provide an annular space thereabout, said annular space being of a radial width at least as great as the radial width of the outwardly extending flanges, the housing having inwardly extending end walls, each flange having its inner face abutting an end wall, means abutting the outer face of each flange for securing it to an end wall in sealing engagement therewith, inlet and outlet pipes secured to the respective end walls in axial alignment with the tube, the pipes having substantially the same internal diameter as the normal internal diameter of the tube and being substantially smaller in outer diameter than the housing, and means for introducing fluid into the annular space to reduce the normal internal diameter of the tube.

FRANK C. SAUSA.

REFERENCES CITED

The following references are of record in the file of this patent:

UNITED STATES PATENTS

| Number | Name | Date |
|---|---|---|
| 1,873,138 | Mitchell | Aug. 23, 1932 |
| 2,241,086 | Gould | May 6, 1941 |
| 2,409,433 | Hunter | Oct. 5, 1946 |
| 2,434,835 | Colley | Jan. 20, 1948 |

FOREIGN PATENTS

| Number | Country | Date |
|---|---|---|
| 210,521 | Great Britain | Nov. 1, 1922 |